(12) United States Patent
Marsh et al.

(10) Patent No.: US 9,417,353 B2
(45) Date of Patent: Aug. 16, 2016

(54) REMOTE PROCESSING OF WELL TOOL SENSOR DATA AND CORRECTION OF SENSOR DATA ON DATA ACQUISITION SYSTEMS

(75) Inventors: Laban Marsh, Houston, TX (US); Stuart Sargeant, Edmonton (CA); Barry McKay, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 12/670,833

(22) PCT Filed: Aug. 1, 2007

(86) PCT No.: PCT/US2007/017145
§ 371 (c)(1),
(2), (4) Date: Jul. 6, 2010

(87) PCT Pub. No.: WO2009/017481
PCT Pub. Date: Feb. 5, 2009

(65) Prior Publication Data
US 2010/0332175 A1 Dec. 30, 2010

(51) Int. Cl.
*G01V 3/18* (2006.01)
*G01V 3/00* (2006.01)

(52) U.S. Cl.
CPC .... *G01V 3/18* (2013.01); *G01V 3/00* (2013.01)

(58) Field of Classification Search
CPC ............. G01V 1/48; G01V 1/40; G01V 1/28; G01V 1/36; G01V 1/362; G01V 1/46; G01V 1/50; G01V 3/38; G01V 2210/72

USPC ............................................ 702/6–7, 11, 104
See application file for complete search history.

(56) References Cited

U.S. PATENT DOCUMENTS 5,889,729 A 3/1999 Frenkel et al.
6,100,696 A * 8/2000 Sinclair ......................... 324/339
(Continued)

FOREIGN PATENT DOCUMENTS

GB 2465120 B 5/2013
WO WO-2006020029 A1 2/2006
(Continued)

OTHER PUBLICATIONS

British Geological Survey, BGS Minerals UK Center for sustainable mineral development, pp. 1-4.*
(Continued)

*Primary Examiner* — Mischita Henson
(74) *Attorney, Agent, or Firm* — Schwegman, Lundberg & Woessner, P.A.; Alan Bryson

(57) ABSTRACT

For some embodiments, a software application for correcting sensor data in a remote database (114, 118) according to magnetic correction parameters obtained from a geophysical survey service, the sensor data obtained from directional instruments on a well tool (107, 108, 110). The remote database resides in a field computer (112) at a well site, and a copy of the remote database may also reside in a real time operations computer system. For some embodiments, the sensor data for particular depths and measurement times are stored as rows in a table (FIG. 3). The correction software may write new rows in the remote database with the corrected sensor data, or may write new rows in a second database for storing corrected sensor data (FIG. 1).

30 Claims, 6 Drawing Sheets

(56) References Cited

U.S. PATENT DOCUMENTS

| | | | |
|---|---|---|---|
| 6,179,067 B1 | | 1/2001 | Brooks |
| 6,308,787 B1 | * | 10/2001 | Alft ............................. 175/48 |
| 6,508,316 B2 | | 1/2003 | Estes et al. |
| 6,518,756 B1 | * | 2/2003 | Morys et al. ................ 324/303 |
| 6,579,560 B2 | | 6/2003 | Kagawa et al. |
| 6,726,943 B2 | | 4/2004 | Prosise et al. |
| 6,991,045 B2 | | 1/2006 | Vinegar et al. |
| 2001/0013412 A1 | * | 8/2001 | Tubel ....................... 166/250.01 |
| 2002/0171560 A1 | | 11/2002 | Ciglenec et al. |
| 2003/0074139 A1 | * | 4/2003 | Poedjono ..................... 702/16 |
| 2004/0010373 A1 | | 1/2004 | Smits et al. |
| 2005/0100652 A1 | | 5/2005 | Kanya et al. |
| 2005/0170065 A1 | | 8/2005 | Xi et al. |
| 2005/0197777 A1 | | 9/2005 | Rodney et al. |
| 2006/0008563 A1 | | 1/2006 | Baumgartner et al. |
| 2006/0038570 A1 | * | 2/2006 | Constable ..................... 324/334 |
| 2009/0133870 A1 | * | 5/2009 | Pavlov et al. ............ 166/250.16 |
| 2009/0155448 A1 | | 6/2009 | Solorio et al. |

FOREIGN PATENT DOCUMENTS

| | | |
|---|---|---|
| WO | WO-2007100766 A2 | 9/2007 |
| WO | WO-2009/017481 A1 | 2/2009 |

OTHER PUBLICATIONS

"Australian Application Serial No. 2007357142, Response filed Apr. 14, 2011 to Examiner's First Report mailed Feb. 10, 2011", 17 pgs.

"Australian Application Seriai No. 2007357142, Examiner's First Report mailed Feb. 10, 2011", 2 pgs.

"International Application Serial No. PCT/US07/17145, Written Opinion mailed Jul. 3, 2008", 7 pgs.

"International Application Serial No. PCT/US07/17145, International Search Report mailed Jul. 3, 2008", 2 pgs.

"Australian Application Serial No. 2007357142, Office Action Response mailed Oct. 7, 2011", 9 pgs.

"Australian Application Serial No. 2007357142, Subsequent Examiner Report mailed May 27, 2011", 2.

"Chinese Application Serial No. 200780100497.2, Office Action mailed Aug. 30, 2011", 14 pgs.

"Chinese Application Serial No. 200780100497.2, Response flied Jan. 13, 2012 to Office Action mailed Aug. 30, 2011", (w/ English Translation of Amended Claims), 16 pgs.

"Chinese Application Serial No. 200780100497.2, Office Action mailed Feb. 29, 2012", w/ English Translation, 23 pgs.

"British Application Serial No. 1003339.7, Office Action mailed Jul. 5, 2012", 3 pgs.

"Chinese Application Serial No. 200780100497.2, Office Action mailed Nov. 1, 2012", (w/ English Translation), 27 pgs.

"British Application Serial No. 1003339.7, Replacement Office Action mailed Jul. 5, 2012", 3 pgs.

"British Application Serial No. 1003339.7, Response filed Feb. 18, 2013 to Office Action mailed Jul. 5, 2012", 15 pgs.

"Chinese Application Serial No. 200780100497.2, Response filed Mar. 18, 2013 to Office Action mailed Nov. 1, 2012", 18 pgs.

"International Application Serial No. PCT/US07/17145, International Preliminary Report on Patentability dated Feb. 2, 2010", 8 pgs.

"Chinese Application Serial No. 200780100497.2, Office Action mailed Feb. 12, 2014", With English Translation, 12 pgs.

"Chinese Application Serial No. 200780100497.2, Office Action mailed Jul. 23, 2013", (w/ English Translation), 22 pgs.

"Chinese Application Serial No. 200780100497.2, Reponse filed Oct. 5, 2013 to Office Action mailed Jul. 23, 2013", (w/ English Translation of Claims), 39 pgs.

"Malaysian Application Serial No. PI2010000442, Office Action mailed Oct. 14, 2013", 3 pgs.

"Malaysian Application Serial No. PI2010000442, Response filed Feb. 25, 2013 to Office Action mailed Oct. 14, 2013", 6 pgs.

"Chinese Application Serial No. 200780100497.2, Response filed Apr. 28, 2014 to Office Action mailed Feb. 12, 2014", (w/ English Translation of Claims), 36 pgs.

* cited by examiner

REMOTE PROCESSING OF WELL TOOL SENSOR DATA AND CORRECTION OF SENSOR DATA ON DATA ACQUISITION SYSTEMS

RELATED APPLICATIONS

This application is a nationalization under 35 U.S.C. 371 of PCT/US2007/017145, filed Aug. 1, 2007 and published as WO 2009/017481 A1 on Feb. 5, 2009; which application and publication are incorporated herein by reference in their entirety and made a part hereof.

FIELD

The present invention relates to measurement while drilling a well.

BACKGROUND

In geo-steering or directional drilling, it is important to determine direction while drilling. Data indicative of drilling tool direction is collected from sensors on the drilling tool for various depths and at various measurement times. Such sensors may measure the local earth's magnetic field, for example. This data is stored in a field computer nearby the well site, and is often stored in another computer system in a real time operations center. In this way, experts at the real time operations center have access to the same database at the remote well site, and may provide their expertise to the analysis of sensor data from various well sites.

Magnetic storms, and other phenomenon, may affect the accuracy of the data obtained from the sensors.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1:
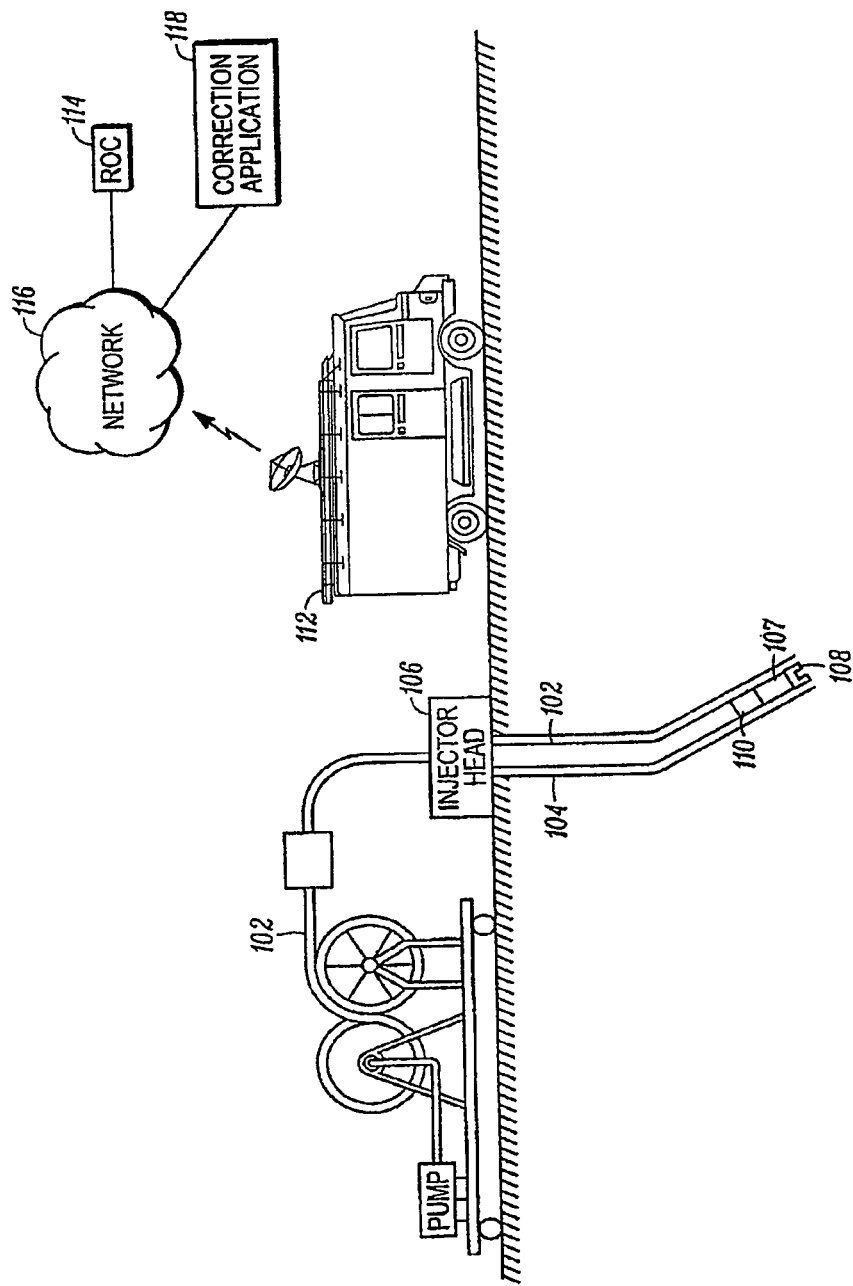
FIG. 1 illustrates a system according to an embodiment of the present invention.

Embodiments are expected to find applications to MWD (Measurement While Drilling) operations in which correction of directional data is desirable. The MWD operations may be performed by conventional drilling using a vertical drill string down a vertical drill hole, or by other types of drilling techniques, such as coiled tube drilling in non-vertical well holes (e.g., horizontal drilling). FIG. 1 illustrates, in simplified fashion, a MWD operation according to an embodiment in which coiled tube drilling and directional drilling are employed to steer a drill bit along a non-vertical borehole. However, it should be appreciated that embodiments are not limited to coiled tube drilling, and are applicable to other types of drilling, such as conventional drilling into vertical boreholes with rigid drill strings.

In FIG. 1, coiled tube 102 is fed into borehole 104 by injector head 106. At an end of coiled tube 102 is rotary steerable tool 107. For some embodiments, drill bit 108 on rotary steerable tool 107 may be powered by a mud-motor, whereby mud is pumped into coiled tube 102. In other embodiments, drill bit 108 may be powered by an electric motor, whereby power may be provided by way of an electrical cable inside coiled tube 102. Above drill bit 108 are tools 110, which may comprise a MWD tool and a LWD tool. A MWD tool may comprise various sensors, such as sensor to provide signals that may be processed to derive directional data, such as for example a magnetometer, an accelerometer, and a gyroscope, to name a few. Data provided by such sensors are transmitted to a field computer, which may reside in field equipment truck 112.

The transmission of the sensor signals from the tool to the field computer at the well site may be performed in a number of ways. For some embodiments, the transmission may be performed wirelessly using a transmitter at or near the MWD tool, and a receiver at the well site. There may be transponders at various points of coiled tube 102. For some embodiments, mud telemetry may be used, whereby pressure pulses in the mud are used to convey information. Other embodiments may utilize a cable, or optic fiber, in coiled tube 102 to provide communication between the MWD tool and the field computer. These examples are cited for illustrative purposes only, and other embodiments may utilize other communication systems.

The field computer performs signal processing on the MWD data to provide estimates of borehole direction as a function of depth. The direction may be represented by an inclination angle relative to vertical, and an azimuth relative to north, where the z-axis for the azimuth angle is taken as the vertical to the borehole at the surface. Based upon this data, the field computer may construct a survey database, providing borehole directional data at different depths of the borehole The survey database is transmitted to Real Time Operations Center (ROC) 114 by way of network 116. ROC 114 may comprise one or more networked computers. Network 116 may be the Internet, in which case for most practical purposes a secure connection is set up between the field computer and ROC 114. For some embodiments, network 116 may be a proprietary network.

Correction application 118 is a software application in communication with the field computer, ROC 114, or both. Correction application 118 corrects the survey databases stored in the field computer and ROC 114 based upon magnetic correction parameters. The updating of the databases may proceed without intervention by a user at the field, or a user at ROC 114. Correction application 118 may reside on a computer, or a number of networked computers, distinct from ROC 114. For some embodiments, correction application 118 may reside on ROC 114. For some embodiments, correction application 118 may obtain real-time magnetic correction parameters from the British Geological Survey (BGS). For other embodiments, surveys other than the BGS may be accessed. Furthermore, for some embodiments, correction parameters other than magnetic correction parameters may be utilized to correct the survey databases.

Figure 2:
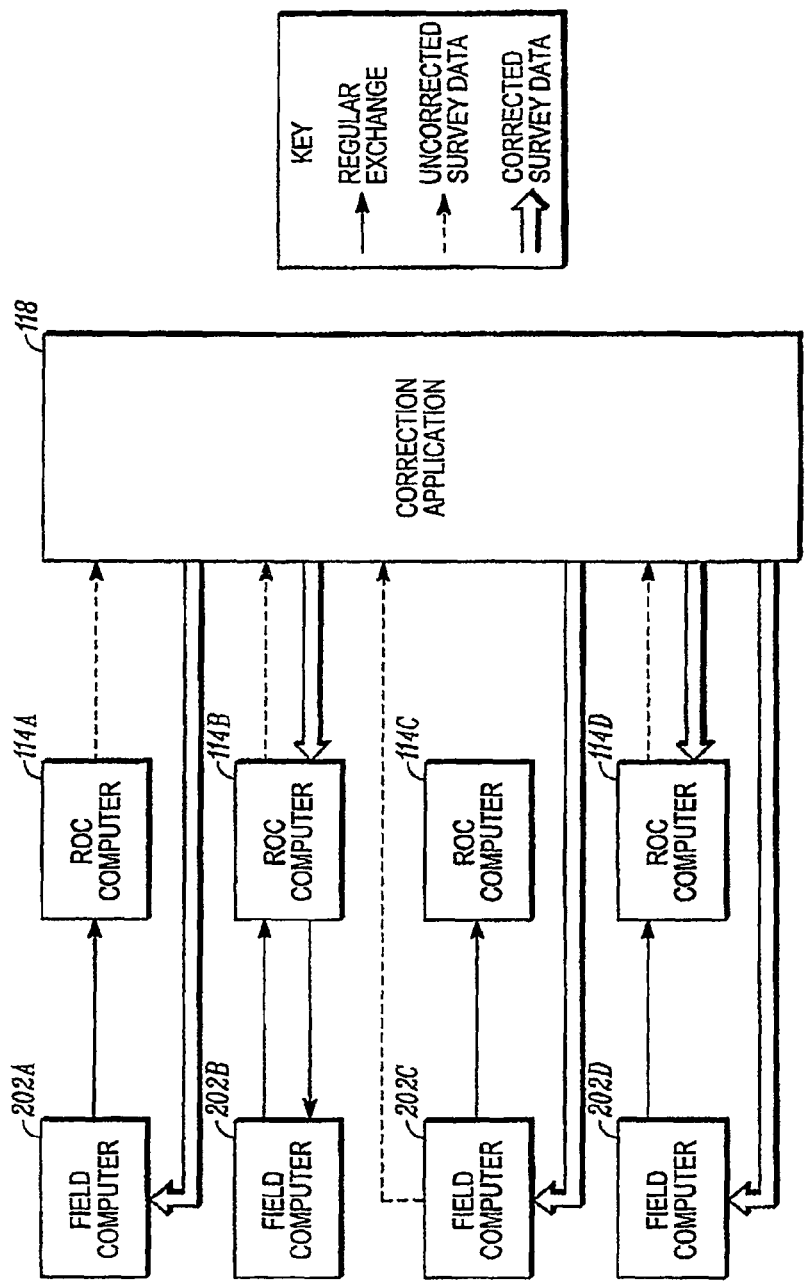
FIG. 2 illustrates a communication model according to an embodiment of the present invention.

FIG. 2 illustrates four communication models by which correction application 118 may correct the survey databases in field computers and ROCs. Communication channels are indicated by arrows, where the direction of the arrow indicates the direction of survey data flow. A solid arrow indicates a communication channel that is independent of correction application 118, a dashed arrow indicates a communication channel that carries uncorrected (non-corrected) survey data (that is to say, not corrected by correction application 118), and a double-lined arrow indicates a communication channel that carries survey data that has been corrected by correction application 118.

In practice, these communication channels are not necessarily direct physical channels, and may represent paths by which data is routed from one router to another. These communication channels may be within a single LAN (Local Area Network), or may span more than one LAN. Various protocols may be used for the communication channels, and may represent a connection oriented paradigm, or a connectionless oriented paradigm. For example, IP/UDP (Internet Protocol/User Datagram Protocol) or TCP/IP may be used. In setting up a communication channel, sockets (e.g., UDP or TCP sockets) are set up between the communicating processes (e.g., field computers, ROCs, and correction application 118). For some embodiments, these sockets are kept open temporarily, long enough for correction application 118 to pull information from databases, and write information to databases. For some embodiments, the connection set up between correction application 118 and a remote database may include the activities of authentication (account and password verification), encryption (exchanging public/private keys), and compression.

Referring to field computer 202a and ROC 114a, field computer 202a transmits its survey database, as new entries are entered, to ROC 114a. This communication channel between field computer 202a and ROC 114a may be set up whether or not correction application 118 is present. When correction application 118 has new correction parameters, it sets up a network connection to the survey database in ROC 114a, and ROC 114a transmits requested survey data from its survey database to correction application 118. When correction application 118 has corrected this requested survey data, it sets up a communication channel with field computer 202a, and corrects the database stored in field computer 202a accordingly. Field computer 202a sets up a communication channel with ROC 114a so that the database stored in field computer 202a is replicated in ROC 114a. In this way, both field computer 202a and ROC 114a have identical databases.

Referring to field computer 202b and ROC 114b, field computer 202b and ROC 114b have bi-directional database replication so that changes to the database in any one of them are propagated to the other, so that each has identical survey databases. This function is independent of whether correction application 118 is present or not. When correction application 118 has new correction parameters, it sets up a communication channel with ROC 114b so that ROC 114b can send requested uncorrected survey data to correction application 118. When correction application 118 has corrected the received survey data, it sets up a communication channel with ROC 114b whereby it corrects the survey database stored in ROC 114b. Because field computer 202b and ROC 114a have a bi-directional communication channel, changes to the database stored in ROC 114a are propagated to field computer 202b.

Referring to field computer 202c, correction application 118 sets up a communication channel with field computer 202c when it has new correction parameters so as to receive requested survey data. When the received survey data has been corrected, correction application 118 corrects the database stored in field computer 202c. Note that ROC 114c does not play a role in the communication between correction application 118 and field computer 202c.

Referring to field computer 202d and ROC 114d, field computer 202d propagates its database to ROC 114d when new entries are added; as for the other field computers discussed above. When correction application 118 has new correction parameters, it sets up a communication path to receive requested survey data from ROC 114d. When this has been corrected, it sets up communication channels to both ROC 114d and field computer 202d so that both of their databases may be corrected at the same time, or nearly the same time.

For some embodiments, correction application 118 may be able to support a relatively large number of field computers and ROCs, for example, between 50 and 100. These field computers and ROCs may utilize some or all of the communication models illustrated in FIG. 2. Furthermore, the number of ROCs and field computers need not be equal to each other. For example, there may be a larger number of field computers than ROCs. The four instances of a communication model illustrated in FIG. 2 are not meant to imply an equal number of field computers and ROCs.

For reading information from a remote database, correction application 118 establishes a network connection to the remote database, executes a database command sequence (a database query) for new data used to perform survey corrections, and then closes the network connection. Timeouts, network errors, and other similar connection difficulties results in correction application 118 closing the database communication connection in progress, and then attempting the same network sequence again.

For some embodiments, correction application 118 periodically polls remote databases for new information. The poll rate and timeout periods may be individually configurable for each remote database.

Correction application 118 obtains correction parameters from a geophysical survey service, such as obtaining magnetic correction parameters from the BGS. Correction application 118 may poll a geophysical survey service to obtain correction parameters. For other embodiments, correction application 118 may be a subscriber in a publish-subscribe paradigm. The BGS and other geographic societies maintain an array of magnetic sensors located around the world, and are able to interpolate the magnetic correction parameters for any spot in the vicinity of these sensors within a few minutes. As a customer service, the BGS provides data on magnetic correction parameters for a specific location on earth close to real-time. For embodiments using the BGS, correction application 118 copies the information to its own database, so that well site magnetic data may be corrected with the BGS corrections. Correction application 118 may subscribe to more than one database to obtain magnetic data from many locations, and may interpolate the magnetic data to other locations for which measured magnetic data may not be available.

Correction application 118 may apply corrections such as earth magnetic field variations, bias, scale factors, tool drift, sag, crustal anomaly, and co-ordinate conversion, to name a few examples. Furthermore, some embodiments may provide further services. For example, correction application 188 may alarm a survey computation when that survey violates some conditional requirement. For some embodiments, magnetic storms may be identified. Data collected during such periods may be identified as suspect in terms of accuracy. Drilling operations may be warned as to the reduced accuracy of magnetic measurements, where the warning is promulgated through the data link back to the rig, alerting rig personnel by an on-screen alarm that survey conditions are not reliable. Alarms may also be transmitted via e-mail and text messaging, and may inform rig personnel when conditions have stabilized to allow valid surveying to proceed.

Figure 3:
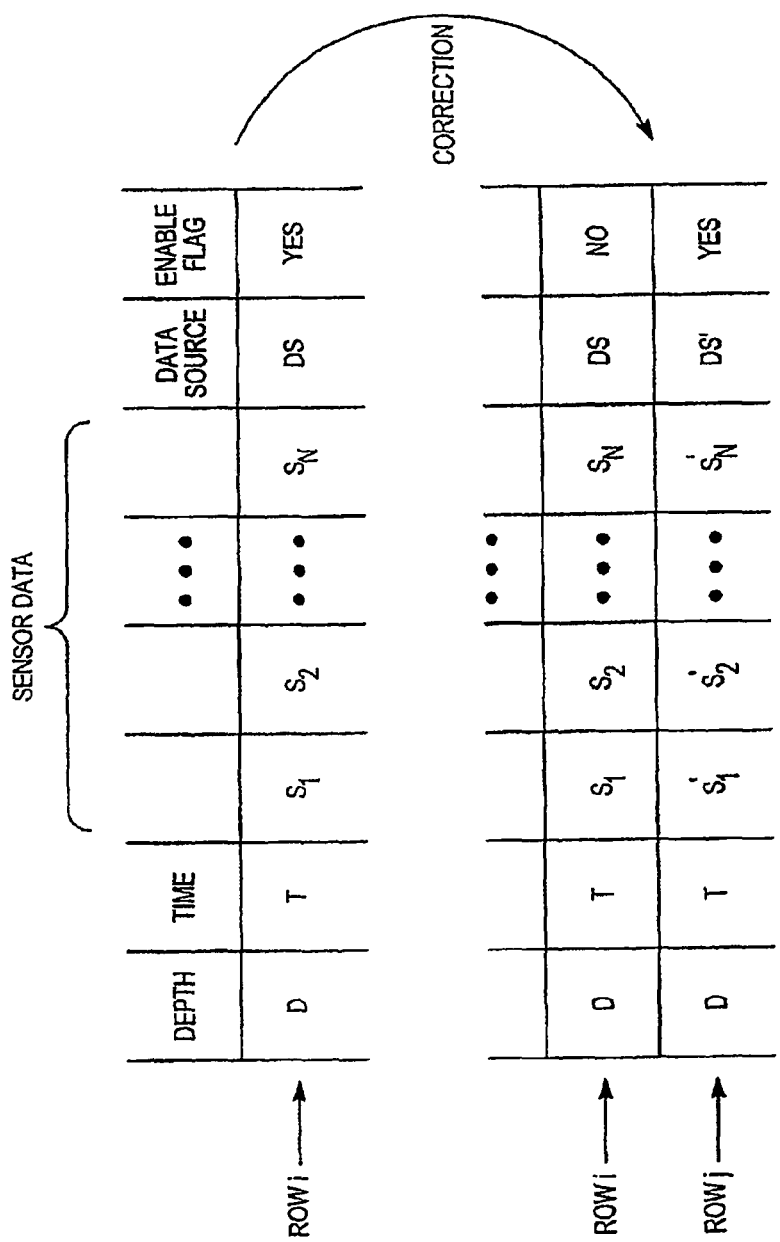
FIG. 3 illustrates correction of a remote database according to an embodiment of the present invention.

Embodiments may store survey data using tables as abstract data types (ADT). FIG. 3 illustrates a table ADT according to an embodiment, where a row (record in the database) comprises fields (columns) such as a depth value, a time value, raw sensor data, a descriptor indicating the data source for the row, and an enable flag. In FIG. 3, the topmost displayed row is some row in the database, say row i, with variable D to denote depth, variable T to denote time, variables $S_1, S_2, \ldots, S_n$ to denote raw sensor data, and variable DS to denote data source. The enable flag is a binary variable, which may be represented by either "YES" or "NO". A YES enable flag indicates that the row of data is available to answer queries, and represents the most current version of the sensor data at that particular depth and time.

The depth values, time values, and data source values may serve as keys to rows in the table ADT. Other embodiments may utilize a different set of keys.

When the topmost displayed row is corrected by correction application 118, its enable flag is changed from YES to NO to indicate that correction equations have been applied to the sensor data. This is indicated by the middle-displayed row in FIG. 3, which is still row i in the database, with the same row values as before except that now the enable flag is set to NO. An enable flag of NO indicates that the row values have been corrected.

Correction application 118 also enters a new row in the table, indicated as row j (last displayed row) in FIG. 3. In row j, the depth and time are the same as in row i, but now the values for the sensor data may have changed, indicated by $S_1'$, $S_2', \ldots, S_n'$. Also, the value for the data source is changed from DS to DS' to indicate that the sensor data has been corrected. For example, the data source in the original row of data, row i, may be Negative Pulse Detection. After correction application 118 has corrected row i, the data source for row i may be changed to Negative Pulse Detection Corrected to indicate that the sensor data has been corrected by correction application 118. The enable flag for new row j is set to YES to indicate that its sensor data may be used for database queries to provide directional information.

As a particular example, suppose the on-site survey processing application writes a new survey row into the survey database with a depth of 13,412 feet, a time value of 10:30:24 pm, and a data source Negative Pulse Detection. During one of its polling sequences for new data, correction application 118 reads the survey at 13,412 feet, 10:30:24 pm, from the remote database and writes the uncorrected survey to its local database, and then corrects the survey data based upon correction parameters it has obtained from one or more geophysical survey services (e.g., BGS). Correction application 118 then corrects the new survey at depth 13,412 feet, time value 10:30:24 pm, and data source Negative Pulse Detection, by changing the flag enable in the original row in the remote database to a value indicating that it is disabled; and by writing a new row into the remote database with the same depth and time as the original row, but where now the data source is changed to Negative Pulse Detection Corrected, and the sensor data is corrected. This new row is enabled.

Figure 4:
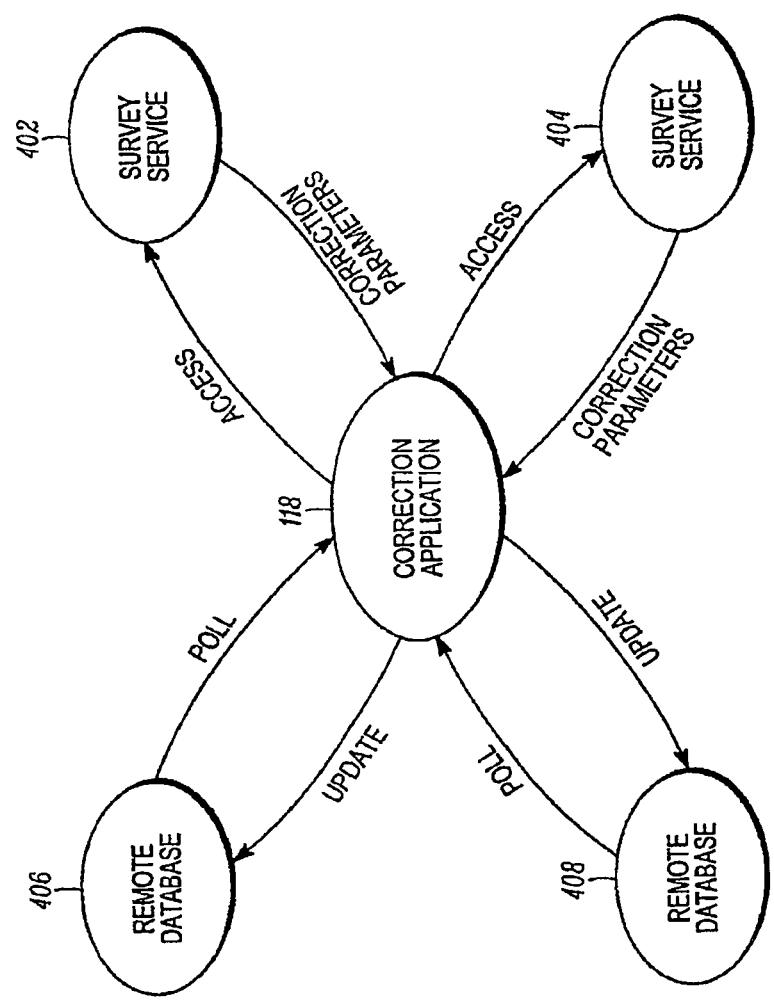
FIG. 4 illustrates a communication model according to an embodiment of the present invention.

The polling of remote databases need not be synchronous with accessing the geophysical survey services for corrected parameters. FIG. 4 illustrates this in simplified form, where correction application 118 communicates with geophysical survey services 402 and 404 for correction parameters. (Embodiments may use one or more geophysical survey services.) In the particular embodiment of FIG. 4, access is made to a geophysical survey service, such as accessing a web site, and correction parameters are then communicated to correction application 118 and stored into memory. For some embodiments, a publish-subscribe communication model may be employed, where correction application 118 subscribes to correction events published by a geophysical survey service. In FIG. 4, correction application 118 polls remote databases 406 and 408, although in practice there may be many remote databases. When data is polled, the survey data is communicated to correction application 118 and stored into memory. The survey data is then corrected according to correction parameters stored in correction application 118. Communication with geophysical survey services 402 and 404, and with remote databases 406 and 408, need not be synchronous.

Note that for the embodiment of FIG. 3, the original row of data has not been deleted by correction application 118. In this way, historical data may still be available for troubleshooting or analysis. By preserving the original data in the survey database, correction application 118 may remove its corrections from one or more rows of the database, and restore some or all of the survey database back to its original, field-computed form. Other embodiments may delete old rows of data when they have been corrected, but such implementations may not provide for restoration of data if copies of the original data have not been made.

Other embodiments may employ ADTs other than tables to store the survey data. Furthermore, other types of database architectures may be used. For example, separate databases for corrected and uncorrected survey data may be used, with a data descriptor that (virtually) pieces together the two sets of data. As a particular example, a time descriptor may indicate the most recent time entry in a database for which corrected data is available. Survey data from a corrected database should be used at the field or ROC when reading database rows having entry times (database keys) less than or equal to the time descriptor, and an uncorrected database should be used otherwise. As correction application 118 reads the uncorrected surveys, processes the surveys, and writes them back to the corrected survey database, the time descriptor used to virtually combine the two databases would be updated to the time at which correction occurred. This is illustrated in FIG. 5.

Figure 5:
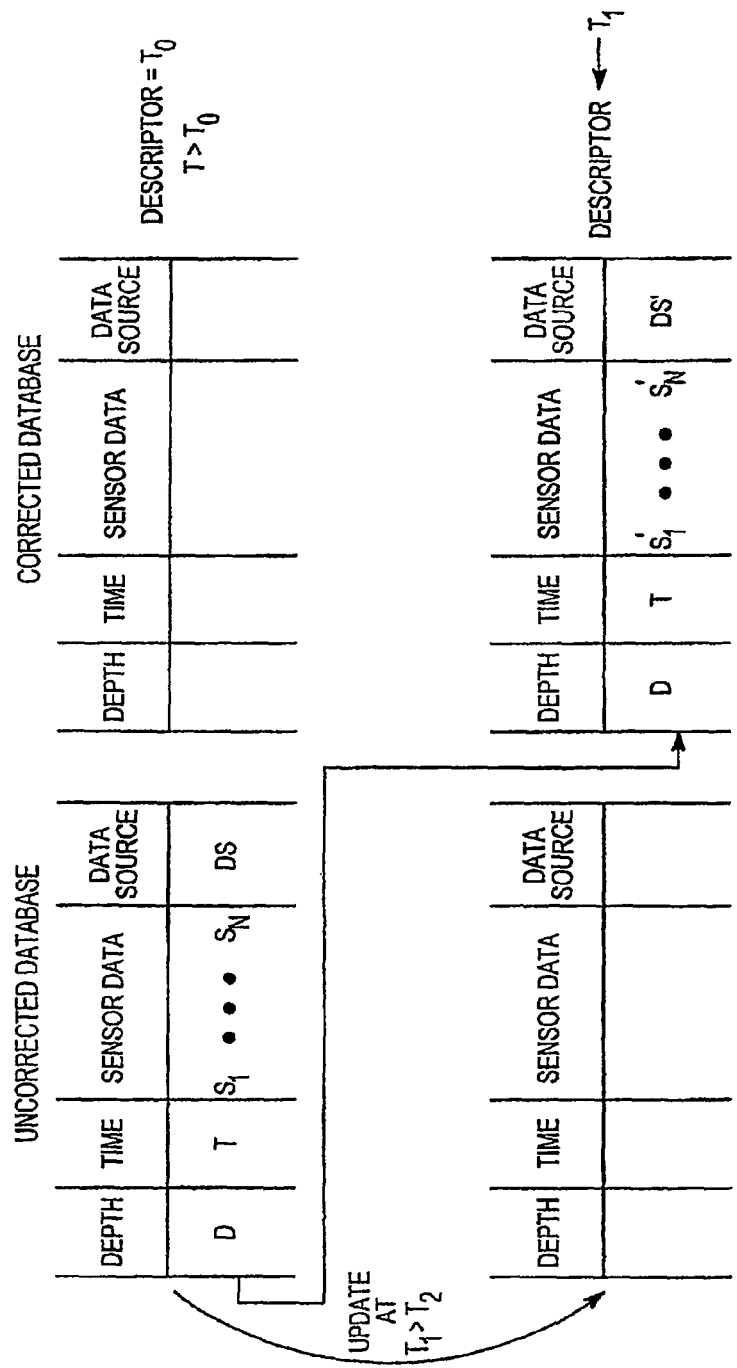
FIG. 5 illustrates correction of a remote database according to an embodiment of the present invention.

FIG. 5 illustrates a row at depth D and time T in two databases, labeled "uncorrected" and "corrected", before and after a time descriptor is corrected. In the top portion of FIG. 5, the time descriptor is at time value $T_0$, where $T>T_0$. In this case, a database query would access the uncorrected database for the row of sensor data corresponding to time T. At time $T_1$, correction application 118 performs a correction. Because $T_1>T$, the row in the uncorrected database is corrected, and the corrected row is placed into the corrected database. This is shown in the bottom portion of FIG. 5. Note that for the particular embodiment of FIG. 5, the old row of data in the uncorrected database is removed once it is corrected. However, other embodiments may retain the old row of data with it properly flagged.

In some applications, correction application 118 may not be able to set up a network connection with a field computer because of secure routers or firewalls, which may allow only outbound traffic and responses to outbound traffic. In such applications, a client may be run on the field computer to initiate communication with correction application 118, and correction application 118 may use a World Wide Web based service to manage movement of data to and from the field computer behind the firewall.

In practice, correction application 118 may be a software application running on one or more general purpose computers, or special-purpose computers optimized for communication. For example, correction application 118 may run on one computer system, or be virtualized over more than one computer system, meaning that parts of correction application 118 may be dynamically instantiated across multiple computers, so as to scale in order to support usage demands.

Figure 6:
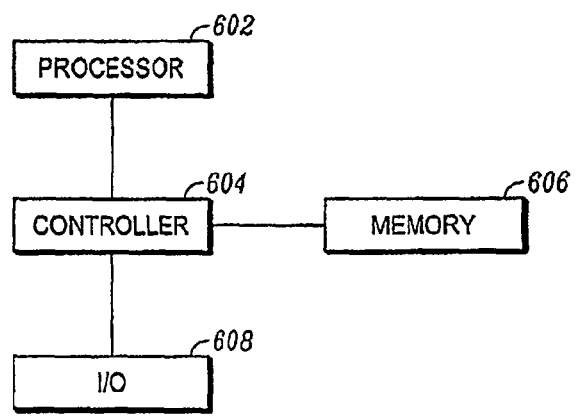
FIG. 6 illustrates a computer system architecture according to various embodiments of the invention.

FIG. 6 illustrates in simple fashion a portion of a computer system in which an embodiment may be instantiated. Functional unit 602 represents one or more processors. Controller 604 serves as an interface between processor 602, memory 606, and I/O (Input/Output) functional unit 608. Controller 604 is sometimes referred to as a chipset, or a hub. Some, or all, of the functionality of controller 604 may be integrated with processor 602. Memory 606 may represent a hierarchy of memory, perhaps including removable storage, and may be referred to in general as computer readable media. I/O functional unit 608 provides communication over a physical link. Instructions stored in memory (computer readable media) 606 cause the computer system of FIG. 6 to implement the previously described processes.

Various modifications may be made to the described embodiments without departing from the scope of the invention as claimed below. For example, for some embodiments, instead of using an enable flag as discussed with respect to FIG. 3, two tables, or two sets of datasets, may be used, where one may be labeled as "survey" and the other may be labeled as "survey disabled". When a row (database record) has been corrected, the old, uncorrected row is deleted from the survey table (database) and written into the survey disabled table (database). The new corrected survey row is written into the survey table (database). The two datasets may be combined virtually for survey management, so that the presence of two separate datasets is invisible to a user.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A method to correct data obtained from sensors on a well tool, comprising:
  making measurements using a sensor on a well tool in a well, generating sensor data associated with a depth within the well and a measurement time of the sensor data, the sensor being a sensor that provides signals to derive directional data;
  retrieving, under control of a processor, magnetic correction parameters over a network from a remote database;
  retrieving under control of the processor, from a first computer system located remotely from and associated with a plurality of geographically separated well sites, the sensor data associated with the depth within the well and the measurement time of the sensor data, the well being at a well site of the plurality of geographically separated well sites, the first computer system and the plurality of geographically separated well sites being separate and remote from the remote database;
  correcting the sensor data by using the processor to transform the sensor data into corrected sensor data according to the magnetic correction parameters;
  writing, under control of the processor, the corrected sensor data to a database of the first computer system and to each database of a plurality of geographically separated computers, the plurality of geographically separated computers being separate and remote from the remote database; and
  controlling directional drilling at one or more of the geographically separated well sites based on the corrected sensor data written into the databases of the first computer system and the plurality of geographically separated computers associated with the one or more of the geographically separated well sites at which the directional drilling is being controlled.

2. The method as set forth in claim 1, wherein the first computer system is a real time operations computer system.

3. The method as set forth in claim 1, wherein the first computer system is a field computer system associated with the well.

4. The method as set forth in claim 1, wherein providing the corrected sensor data to the first computer system comprises:
  providing the corrected sensor data to a second computer system, the second computer system being a computer of the plurality of geographically separated computers; and
  communicating the corrected sensor data from the second computer system to the first computer system.

5. The method as set forth in claim 1, wherein the sensor data is part of a row in a table abstract data type stored in the first computer, the method further comprising:
  storing a new row in the table abstract data type, the new row including the corrected sensor data obtained by correcting the sensor data with the magnetic correction parameters.

6. The method as set forth in claim 5, the table abstract data type including a field for a data source, the row including a data source field value associated with the sensor data, the new row including a corrected data source field value obtained by updating the data source field value to indicate that the sensor data has been corrected using the magnetic correction parameters.

7. The method as set forth in claim 5, wherein the table abstract data type includes an enable flag field, the row including an enable flag field value, the method further comprising:
  changing the enable flag field value of the row after the new row is stored in the table abstract data type.

8. The method as set forth in claim 1, wherein the sensor data is part of a row in an uncorrected table abstract data type stored in the first computer, the method comprising:
  storing a new row in a corrected table abstract data type, the new row including the corrected sensor data obtained by updating the sensor data with the magnetic correction parameters.

9. The method as set forth in claim 8, the corrected and uncorrected table abstract data types each having a field for a data source, the row in the uncorrected table abstract data type having a data source field value associated with the sensor data, the new row including a corrected data source field value obtained by updating the data source field value to indicate that the sensor data has been corrected using the magnetic correction parameters.

10. An article of manufacture comprising a non-transitory memory device having instructions stored therein, which when read by at least one computer system, causes the at least one computer system to:
  implement the making of measurements using a sensor on a well tool in a well, generating sensor data associated with a depth within the well and a measurement time of the sensor data, the sensor being a sensor that provides signals to derive directional data;
  retrieve magnetic correction parameters over a network from a remote database;
  retrieve, from a first computer system located remotely from and associated with a plurality of geographically separated well sites, the sensor data associated with the depth within the well and the measurement time of the sensor data, the well being at a well site of the plurality of geographically separated well sites, the first computer system and the plurality of geographically separated well sites being separate and remote from the remote database;

correct the sensor data to transform the sensor data into corrected sensor data according to the magnetic correction parameters;

write the corrected sensor data to a database of the first computer system and to each database of a plurality of geographically separated computers, the plurality of geographically separated computers being separate and remote from the remote database; and control directional drilling at one or more of the geographically separated well sites based on the corrected sensor data written into the databases of the first computer system and the plurality of geographically separated computers associated with the one or more of the geographically separated well sites at which the direction drilling is being controlled.

11. The article of manufacture as set forth in claim 10, wherein the first computer system is a real time operations computer system.

12. The article of manufacture as set forth in claim 10, wherein the first computer system is a field computer system associated with the well.

13. The article of manufacture as set forth in claim 10, wherein to provide the corrected sensor data to the first computer system, the instructions further cause the at least one computer system to:

provide the corrected sensor data to a second computer system, the second computer system being a computer of the plurality of geographically separated computers; and communicate the corrected sensor data from the second computer system to the first computer system.

14. The article of manufacture as set forth in claim 10, wherein the sensor data is part of a row in a table abstract data type stored in the first computer, the instructions further causing the at least one computer system to:

store anew row in the table abstract data type, the new row including corrected sensor data obtained by correcting the sensor data with the magnetic correction parameters.

15. The article of manufacture as set forth in claim 14, the table abstract data type including a field for a data source, the row including a data source field value associated with the sensor data, and the new now including a corrected data source field value obtained by updating the data source field value to indicate that the sensor data has been corrected using the magnetic correction parameters.

16. The article of manufacture as set forth in claim 14 where the table abstract data type includes an enable flag field, the row including an enable flag field value, the instructions further causing the at least one computer system to:

change the enable flag field value of the row after the new row is stored in the table abstract data type.

17. The article of manufacture as set forth in claim 10, wherein the sensor data is part of a row in an uncorrected table abstract data type stored in the first computer, the instructions further causing the at least one computer system to:

store a new row in a corrected table abstract data type, the new row including corrected sensor data obtained by updating the sensor data with the magnetic correction parameters.

18. The article of manufacture as set forth in claim 17, the corrected and uncorrected table abstract data types each having a field for a data source, the row in the uncorrected table abstract data type having a data source field value associated with the sensor data, the new row including an corrected data source field value obtained by updating the data source field value to indicate that the sensor data has been corrected using the magnetic correction parameters.

19. A system comprising:

a sensor on a well tool in a well operable to make measurements in the well to generate sensor data associated with a depth within the well and a measurement time of the sensor data, the sensor being a sensor that provides signals to derive directional data;

a plurality of field computer systems, each associated with a geographically separated well site, each configured to store the sensor data obtained from the well tool as a function of well depth and measurement time; and a real time operations computer system located remotely from and in communication with the plurality of field computer systems, wherein the real time operations computer system mirrors the sensor data stored in the plurality of field computer systems, the real time operations computer system operable to form a network connection to retrieve magnetic correction parameters over a network from a remote database, which remote database contains data for at least the geographically separated well sites, and to correct the sensor data based upon the magnetic correction parameters and to write the corrected sensor data to and store the corrected sensor data in each database of the plurality of field computer systems and a database of the real time operations computer system, the remote database being separate and remote from the plurality of field computer systems, the geographically separated well sites, and the databases of the plurality of geographically separated well sites, wherein each field computer system and/or real time operations computer system is operable to control directional drilling at the geographically separated well site associated with the respective field computer system based on the corrected sensor data written into the database of the respective field computer system or the database of the real time operations computer system.

20. The system as set forth in claim 19, wherein the real time operations computer system makes a network connection to a field computer of the plurality of field computer systems to retrieve the sensor data stored in the field computer system and to provide the corrected sensor data to the field computer system.

21. The system as set forth in claim 19, wherein the remote database is a database of a geophysical survey service.

22. The system as set forth in claim 19, wherein the sensor data is stored in a row in a table abstract data type, the table abstract data type including a depth field and a time field, the row comprising a depth value and a time value.

23. The system as set forth in claim 22, wherein the computer system writes a new row in the table abstract data type, the new row comprising the corrected sensor data, the depth value, and the time value.

24. The system as set forth in claim 19 wherein the sensor data is stored in a row in an uncorrected table abstract data type, the uncorrected table abstract data type including a depth field and a time field, the row comprising a depth value and a time value.

25. The system as set forth in claim 24, wherein the computer system writes a row in a corrected table abstract data type, the row comprising the corrected sensor data, the depth value, and the time value.

26. The method as set forth in claim 1, wherein the sensor data includes tool directional data from the sensor disposed on a Measurement While Drilling tool.

27. The article of manufacture as set forth in claim 10, wherein the sensor data includes tool directional data from the sensor disposed on a Measurement While Drilling tool.

28. The method as set forth in claim 1, wherein the remote database is a database of a geophysical survey service, the database containing data from an array of magnetic sensors located around the world to provide the magnetic correction parameters.

29. The method as set forth in claim 28, wherein the geophysical survey service is British Geological Survey.

30. The method as set forth in claim 1, wherein retrieving, under control of the processor, magnetic correction parameters over the network from the remote database includes polling the remote database.

\* \* \* \* \*